Jan. 18, 1944.  G. SMITH  2,339,607
METHOD OF PREPARING MOLDABLE MATERIAL
Filed July 7, 1942
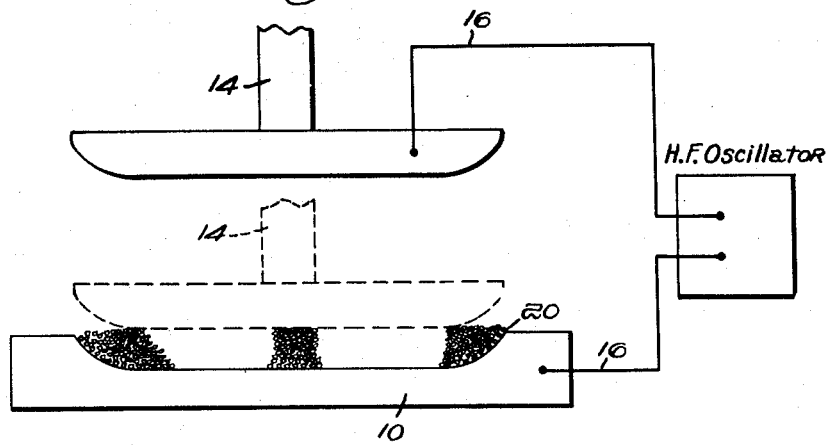
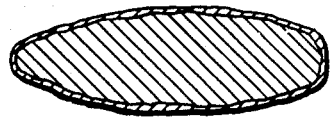

Patented Jan. 18, 1944

2,339,607

UNITED STATES PATENT OFFICE 2,339,607

METHOD OF PREPARING MOLDABLE MATERIAL

Graydon Smith, Concord, Mass., assignor to Reed-Prentice Corporation, Worcester, Mass., a corporation of Massachusetts Application July 7, 1942, Serial No. 450,033

6 Claims. (Cl. 18—48)

My invention relates to the art of molding objects by the general method of reducing a suitable material to fluid or plastic condition by the application of heat and then placing the material in a mold cavity in which it is allowed to solidify. Thermoplastic or thermal setting materials may be used in such processes, and my invention comprises a method of preparing a material for molding by preheating it to provide a wad which is internally fluid or plastic but has a skin relatively cooler than the interior and which is non-tacky and relatively firm. The wad so produced may quickly be inserted into a heated injection chamber adjacent to a mold and therein heated to reduce the skin to plastic condition and injected into the mold or the wads can be placed directly in a hot mold and pressed into desired shape.

The most important object of my invention is to simplify and cheapen the process of producing molded plastic objects.

An important feature of my invention comprises the use of high frequency current passed through a condenser in which a charge of moldable material is used as a dielectric and the material is heated by dielectric losses, while the exterior of the charge loses heat to a plate of a condenser and so remains relatively firm and cool. Thus the dielectric properties of materials commonly used in molding plastics is the basis of my novel process.

A very important advantage resulting from the use of my new process is that it renders unnecessary the employment of a massively constructed chamber in which cold molding material is placed and forced through a heating portion of the chamber wherein the material is reduced to plastic condition as it passes through the chamber and into a mold cavity. Hitherto it has been necessary to provide such a strong and massive chamber which can be kept filled from a hopper containing cold material and in which the gradually softening material can be forced through a nozzle by means of a powerful ram. The stresses involved in this kind of apparatus are tremendous and it will be apparent that these stresses are reduced in very large degree by supplying the apparatus with molded material preheated in accordance with my invention. Furthermore, in the apparatus presently employed it is extremely difficult to obtain uniform heating of the mass of material being molded since the exterior of the material is scorched if enough heat is applied to reach the interior of the mass.

My invention contemplates the production of wads or charges of moldable material in which all but a thin skin is rendered plastic. The wads may be placed directly in a hot mold, or first passed through a final heating chamber preparatory to injection into a mold.

These and other objects and features of the invention will be best understood and appreciated from the following description of a preferred embodiment thereof selected for purposes of illustration and shown in the accompanying drawing in which, Fig. 1 is a view in side elevation of a heating condenser constructed according to my invention, and Fig. 2 is a view in cross section through a preheated charge of moldable material.

The apparatus with which my new process may conveniently be carried out is shown in Fig. 1 and includes a relatively shallow tray or cup 10 formed of metal or other suitable conducting material. Suspended for vertical movement to and from the tray 10 is a metal plate 12 secured to a shaft 14 by which it is raised or lowered. The mechanism for controlling the plate 12 forms no part of the invention. Wires 16 and 18 connected to the plate 12 and the tray 10 respectively lead to a source of high frequency current, preferably an oscillator.

By "high frequency" I mean the range of frequencies generally referred to as "radio-frequency," of the order of one million cycles, as contrasted with low or audio-frequencies of a few thousand cycles.

It will be apparent that the tray 10 and the plate 12 form the plates of a condenser through which high frequency current is passed.

In carrying out the process of the invention I place a mass 20 of moldable material of predetermined quantity on the tray, the rim serving to prevent spilling. The plate 12 is lowered until it reaches the upper surface of the mass 20, the circuit is then closed and high frequency current flows in the circuit. The mass 20 is a dielectric and quickly becomes heated due to intermolecular friction in the material.

While the generation of heat tends to be uniform, the mass loses heat to the plates of the condenser with the result that the interior becomes fluid or plastic while the surface remains relatively cool and in the form of a firm skin. It is important to note that the exterior does not become sticky or tacky.

The charge so produced is amorphous and may be placed directly in the cavity of a hot mold and subsequently subjected to pressure to conform the charge to the configuration of the mold. The surface of the charge is smooth and not sticky; the plastic interior renders the charge amorphous and capable of flowing under moderate pressure. The proposed charge is sufficiently cool on the surface and is so poor a conductor of heat that it may be handled with gloves and pressed by hand to a desired configuration before insertion in a mold. If desirable, the lower plate of the condenser may be given roughly the shape of the cavity in which the charge is to be molded.

An alternative use of the preheated charge is in the field of injection molding of the nature described in Patent No. 2,057,945. The preheated charges may be fed into a chamber having a heated nozzle portion which keeps the charges hot enough to remain plastic. A ram is intermittently operated to force quantities or "shots" of the heated material into a mold cavity and it will be apparent that the power and pressure required is very substantially reduced by employing molded material preheated to plastic condition in accordance with my invention. The fact that the surface of the charges are not adhesive reduces the resistance encountered by the ram, thus simplifying and facilitating the process of injection molding.

It is convenient to make the condenser a part of the tuned oscillator circuit, combining it with a suitable inductance. Otherwise the condenser must be tuned to resonance with an oscillator circuit, and since the capacity thereof changes as the material becomes heated, it would also be necessary to retune the condenser from time to time during each cycle of the process. By including the condenser as part of the tuned circuit of the oscillator such retuning becomes unnecessary, since a change in resonant frequency then has no effect.

Having thus disclosed my invention and illustrated the novel process, what I claim as new and desire to secure by Letters Patent of the United States is:

1. A method of preparing for molding moldable material having dielectric properties, which comprises the heating of a mass of said material by effecting dielectric losses therein to a degree rendering its interior plastic while simultaneously therewith retaining a relatively firm and non-tacky skin about the mass by extracting heat from the exterior surface thereof.

2. A method of preparing for molding moldable material having dielectric properties, which comprises the heating of a mass of said material to a degree rendering its interior plastic by passing a high frequency electric current through the mass while simultaneously therewith retaining a relatively firm and non-tacky skin about the mass by extracting heat from the exterior surface thereof.

3. A method of preparing for molding moldable material having dielectric properties, which comprises the placing of a mass of said material between the plates of a condenser, heating the mass to a degree rendering its interior plastic by passing a high frequency electric current therethrough from the condenser, and simultaneously therewith retaining a relatively firm and non-tacky skin about the mass by extracting heat therefrom through contact of the condenser plates therewith.

4. A method of molding moldable material having dielectric properties, which comprises the heating of a mass of said material by effecting dielectric losses therein to a degree rendering its interior plastic while simultaneously therewith retaining a relatively firm and non-tacky skin about the mass by extracting heat from the exterior surface thereof, and thereafter transferring the mass thus formed to a mold and compressing it to the shape of the mold cavity.

5. A method of molding moldable material having dielectric properties, which comprises the heating of a mass of said material by effecting dielectric losses therein to a degree rendering its interior plastic while simultaneously therewith retaining a relatively firm and non-tacky skin about the mass by extracting heat from the exterior surface thereof, thereafter transferring the mass to a heated chamber, and injecting the material from the chamber into a mold.

6. A charge of moldable material having dielectric properties and prepared for molding, which comprises an amorphous mass of the material having a hot plastic interior and a relatively cold, firm and non-tacky exterior skin, prepared by the method defined in claim 1.

GRAYDON SMITH.